US012651596B2

(12) United States Patent
Henault-Ethier et al.

(10) Patent No.: US 12,651,596 B2
(45) Date of Patent: Jun. 9, 2026

(54) SYSTEMS AND METHODS FOR INTERACTION ANALYTICS

(71) Applicant: The Toronto-Dominion Bank, Toronto (CA)

(72) Inventors: Michel Henault-Ethier, Montreal (CA); Brendan Dunne, Saint-Lazare (CA); Christy Megan Nippard, Clarence-Rockland (CA)

(73) Assignee: The Toronto-Dominion Bank, Toronto (CA)

( * ) Notice: Subject to any disclaimer, the term of this patent is extended or adjusted under 35 U.S.C. 154(b) by 179 days.

(21) Appl. No.: 18/471,812

(22) Filed: Sep. 21, 2023

(65) Prior Publication Data

US 2025/0104700 A1    Mar. 27, 2025

(51) Int. Cl.
| | |
|---|---|
| *H04M 3/42* | (2006.01) |
| *G10L 15/18* | (2013.01) |
| *G10L 15/30* | (2013.01) |
| *G10L 25/60* | (2013.01) |
| *H04M 3/51* | (2006.01) |

(52) U.S. Cl.
CPC .......... *G10L 15/1815* (2013.01); *G10L 15/30* (2013.01); *G10L 25/60* (2013.01); *H04M 3/42221* (2013.01); *H04M 3/5175* (2013.01); *H04M 3/5183* (2013.01)

(58) Field of Classification Search
None
See application file for complete search history.

(56) References Cited

U.S. PATENT DOCUMENTS

| | | | |
|---|---|---|---|
| 8,145,562 | B2 | 3/2012 | Wasserblat |
| 10,635,695 | B2 | 4/2020 | Seth |
| 10,728,384 | B1 | 7/2020 | Channakeshava |
| 11,082,554 | B2 | 8/2021 | Pham |
| 11,250,876 | B1 | 2/2022 | Mccloskey |
| 11,264,012 | B2 | 3/2022 | Mital |
| 11,295,315 | B2 | 4/2022 | Veggalam |
| 11,677,875 | B2 | 6/2023 | Krucek |
| 12,164,542 | B1 | 12/2024 | Rahman |
| 2010/0332287 | A1 | 12/2010 | Gates |
| 2020/0243062 | A1* | 7/2020 | Scodary ................ H04M 3/493 |
| 2021/0005207 | A1* | 1/2021 | Adibi ...................... H04L 51/02 |

(Continued)

FOREIGN PATENT DOCUMENTS

WO        2023096867 A1    6/2023

OTHER PUBLICATIONS

Lye and Teh. Customer Intent Prediction using Sentiment Analysis Techniques. 2021 11th IEEE International Conference on Intelligent Data Acquisition and Advanced Computing Systems: Technology and Applications (IDAACS), Cracow, Poland, 2021, published Sep. 2021, pp. 185-190.

(Continued)

*Primary Examiner* — Nafiz E Hoque
(74) *Attorney, Agent, or Firm* — Marks & Clerk; Paul Horbal

(57) ABSTRACT

Systems and methods for recording and transcribing conversations in real-time. Sentiment analysis is performed on each utterance to determine both an intent of the conversation along with sentiment. Annotated transcripts are provided. A machine learning model may be used to augment sentiment analysis.

20 Claims, 3 Drawing Sheets

(56)        References Cited

U.S. PATENT DOCUMENTS

| | | | |
|---|---|---|---|
| 2022/0116485 A1 | 4/2022 | Gandhi | |
| 2022/0293107 A1 | 9/2022 | Leaman | |
| 2022/0309251 A1 | 9/2022 | Shoaf | |
| 2022/0319496 A1* | 10/2022 | Rosenberg | G10L 13/02 |
| 2024/0428000 A1* | 12/2024 | Shi | H04L 12/1831 |
| 2025/0028852 A1 | 1/2025 | Chowanski | |
| 2025/0030547 A1 | 1/2025 | Chowanski | |
| 2025/0068646 A1 | 2/2025 | Rahman | |
| 2025/0077939 A1 | 3/2025 | Tabatabaei | |
| 2025/0086151 A1 | 3/2025 | Arora | |

OTHER PUBLICATIONS

Nambiar et al. Discovering customer intent in real-time for stream-lining service desk conversations. Conference: Proceedings of the 20th ACM Conference on Information and Knowledge Management, CIKM 2011, Glasgow, United Kingdom, published Oct. 2011, pp. 1383-1388.

* cited by examiner

300

302
RECORD A CONVERSATION

304
TRANSCRIBE OR CONTINUE TRANSCRIBING

306
STORE OR UPDATE RECORDING AND TRANSCRIPT IN DATABASE

307
DETECTED UTTERANCE?

NO

YES

308
IDENTIFY INTENT OF CONVERSATION FROM TRANSCRIPT

310
STORE INTENT ASSOCIATED WITH TRANSCRIPT IN DATABASE

312
GENERATING REPORT

SYSTEMS AND METHODS FOR INTERACTION ANALYTICS

TECHNICAL FIELD

The disclosed exemplary embodiments relate to computer-implemented systems and methods for processing data and, in particular, to systems and methods for analyzing user activity.

BACKGROUND

In certain settings, it may be desirable to monitor communications between different parties, such as between a service provider agent and a client. The monitoring may be in the form of, for example, recording telephone calls and transcribing them. The desire for monitoring may stem from a number of reasons including a desire to improve training of personnel for interacting with a client under different circumstances, recordkeeping, quality assurance, or performance management for example.

SUMMARY

The following summary is intended to introduce the reader to various aspects of the detailed description, but not to define or delimit any invention.

In at least one broad aspect, there is provided a call monitoring system, the system comprising: a database; at least one server configured to: record a conversation to the database; and generate, in real-time, a transcript corresponding to the conversation, the transcript comprising a plurality of utterances; identify, in real-time, at least one intent of the conversation from the transcript; store the transcript in the database; and store the at least one intent in association with the transcript in the database.

In some cases, the at least one intent is identified using a data dictionary.

In some cases, the at least one server is further configured to analyse the conversation and the transcript to determine a plurality of sentiments respectively corresponding to the plurality of utterances in the transcript.

In some cases, each of the plurality of sentiments has a corresponding confidence level.

In some cases, the at least one intent is identified further based on the plurality of sentiments.

In some cases, the at least one server is further configured to generate least one score for the conversation. In some cases, the at least one score comprises an abuse score. In some cases, the at least one score comprises a quality score. In some cases, the at least one score comprises a complaint score. In some cases, the complaint score is determined based on the at least one intent and the plurality of sentiments.

In some cases, at least one intent is identified using a machine learning model, the machine learning model being trained on one or more previously captured transcripts.

In another broad aspect, there is provided a method comprising: recording a conversation; generating, in real-time, a transcript corresponding to the conversation; storing a recording of the conversation and the transcript in a database; identifying, in real-time, at least one intent of the conversation from the transcript; and storing the at least one intent in association with the transcript in the database.

In some cases, the identifying the at least one intent comprises using a data dictionary.

In some cases, the method may further comprise analysing the recording and the transcript to determine a plurality of sentiments respectively corresponding to a plurality of utterances in the transcript.

In some cases, the identifying the at least one intent is based on the plurality of sentiments.

In some cases, the method may further comprise generating at least one score for the conversation. In some cases, the at least one score comprises one or more of an abuse score, a quality score, and a complaint score.

In some cases, the method may further comprise determining the complaint score based on the at least one intent and the plurality of sentiments.

In some cases, the identifying the at least one intent comprises using a machine learning model, the machine learning model being trained on one or more previously captured transcripts.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Some third party systems exist for capturing client activity and interactions with service providers. For voice interactions, such as via telephone, transcription is typically also performed by a third party provider, which may or may not be the same as the recording party. This may be implemented by way of an external, third party server(s) capturing the client interactions as they occur or soon after. The transcription can be performed at the same server, or on a separate server. The transcription can be automatically performed, or involve manual intervention.

Reliance on third party capture and transcription of client interactions may have an impact on quantitative and qualitative factors of the client interaction monitoring. Qualitative factors may include maintenance considerations (e.g., with maintenance of the systems providing the capture and transcription out of the control of the service provider, there is no way for the service provider to impact when the capture and transcription may be out of service, be it for routine maintenance, updates, or from unscheduled outages) which may result in a period of time where client interactions are not monitored, or the capture and transcription process is inoperable or operating with a reduced functionality. Moreover, the accuracy of existing client interaction monitoring may be suboptimal. The service provider is also reliant on the third party for the roll out of changes to the client monitoring platform or additional functionality. Quantitative factors may include bandwidth and network performance issues, including latency and storage issues, which may preclude retaining high-quality recordings and prevent the highest quality transcriptions. Relatedly, third-party transcription may be degraded in quality because it is not customized or customizable to the first party's specific needs.

The described embodiments generally provide for first party, or on premises, client interaction analytics that include client interaction recording, transcription, analytics, and reporting. The described embodiments can also provide interaction monitoring and analytics at significant scales.

Figure 1:
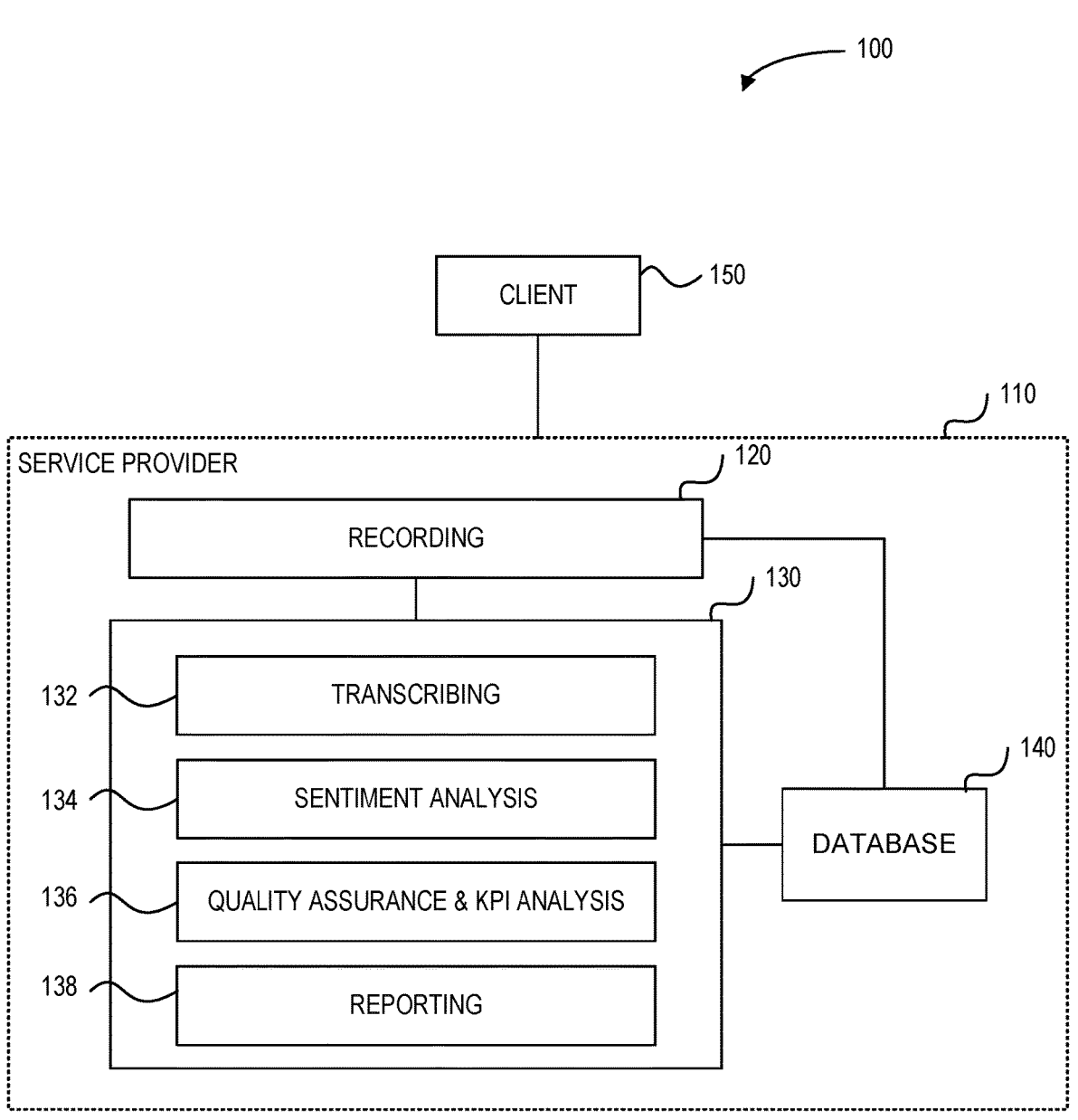
FIG. 1 is a schematic block diagram of an exemplary interaction analytics system in accordance with at least some embodiments.

Referring now to FIG. 1, there is illustrated a block diagram of an example system for interaction analytics, in accordance with at least some embodiments. The system 100 includes a service provider 110 that undergoes an interaction with client 150. The service provider 110 has a recording module 120, a server 130 that has a number of modules including a transcribing module 132, a sentiment analysis module 134, a quality assurance (QA) and key performance indicator (KPI) analysis module 136, a reporting module 138, and a database 140. The database 140 may be stored on the server 130 or on a different server, or the database 140 may be cloud-based.

The interaction with the client 150 typically commences when client 150 contacts the service provider 110, for example via telephone call to a contact centre. In some cases, the service provider 110 may initiate the interaction. The client interaction may pertain to, for example, a question or concern relating to a client account, a transaction, a received service, or others. When the client 150 initiates the client interaction, they are connected to an agent representing the service provider 110.

The interaction is captured by the recording module 120. The recording module 120 may be a recording platform such as Verint™ or Genesys Speechminer™. The recording module 120 records the client interaction in real-time and the recording is stored on the database 140. The recording is sent to the server 130 for analysis. The recording module 120 may be hosted on the server 130, on a different server or in the cloud.

The server 130 receives the client interaction from the recording module 120. The server 130 has inbuilt modules including the transcribing module 132, the sentiment analysis module 134, the quality assurance (QA) and key performance indicator (KPI) analysis module 136, and the reporting module 138 to perform analysis on the recorded client interaction. The server 130 may host an engine, such as Azure Cognitive Service™, to operate the different modules.

The transcribing module 132 automatically analyses the recording from the recording module 120, and creates a file that contains the client interaction in written form, i.e. a transcript of the client interaction. The transcript contains a plurality of utterances associated with the client interaction. The transcribing module 132 contains a machine learning model to aid the transcription process. The accuracy of the transcription and associated analytics may be increased by training the machine learning model on data specific to the service provider's 110 environment, i.e. previously analysed transcripts. The transcript may be annotated, with the annotations used to identify client intents. The transcribing module 132 identifies the entities, e.g., the client and the agent, as part of the transcription process, which may be represented as annotations on the transcript. The transcript is stored in the database 140.

The transcribing module 132 includes functionality to baseline the client interactions. A client interaction may be in a language that in not English; for example the client interaction may be in Spanish or French. Each recording may be transcribed in single language, e.g., English, so that all stored transcripts are in a common language. On detection of the client interaction being in another language, such as Spanish or French, the transcribing module 132 automatically translates the recording as it transcribes.

The sentiment analysis module 134 captures and analyses critical behaviours. The transcript is analysed to determine the intent and sentiment of the client interaction. Intent recognition may be based on a data dictionary or dictionaries, which may be provided or updated in the form of extensible Markup Language (XML) or JavaScript Object Notation (JSON) files. The intent of the call may be based on matching keywords in the transcript to keywords within the data dictionary, e.g., opening or closing an account. A transcript may be reprocessed at any time should new or updated data dictionaries be made available. The intent may also be determined based on the sentiment, or sentiments, detected in the client interaction.

The transcript is analysed to determine if the call is positive, negative, or neutral, and key word searching is used to determine the nature of the call so that relevant topics may be retrieved (either from the database 140 or another database or entity hosting agent interaction support materials) to inform the agent's prompts for steering the client interaction, and for language detection.

Analysis of the transcript permits identification of: non-talk time, cross talk, and abuse in the call. The sentiment analysis module 134 detects abuse based partly on determining the intent of the client, partly on the sentiment of the client interaction, and partly based on QA, therefore detecting what the client interaction is about, whether the client interaction is positive or negative, and identifying parts of the client interaction that are not relevant to the intent, or specific words of phrases. The sentiment analysis module 134 determines the sentiment of both the agent and the client, the intent of the call, and the presence of abuse.

One aspect of the sentiment analysis is to identify complaints so that they may be identified, catalogued, and reviewed to ensure satisfactory resolution or to revise agent processes and prompts when dealing with recurring complaints. A complaint may be detected through intent and sentiment analysis by the sentiment analysis module 134. The complaint may be detected by keywords being flagged in the transcript and additional processing to identify that the client interaction relates to a complaint. The sentiment analysis module 134 tags it, therefore future interactions with the same client that may also relate to the same topic can be tagged creating a timeline for the complaint. The complaint can therefore be tracked from the time it was first raised by the client through to resolution. By identifying a client interaction as a complaint, the sentiment analysis module 134 can provide an indication if an escalation is required, e.g. to an agent supervisor.

The sentiment analysis module 134 may provide a machine learning model to enhance the analysis of the transcript. The accuracy of the machine learning model can be improved by training with data from the service provider's 110 environment, e.g., previously analysed transcripts. The sentiment analysis can be performed by the sentiment analysis module 134 continuously to identify a sentiment (and an associated confidence level) for every utterance in the client interaction.

The QA and KPI module 136 may be used to measure agent performance, score client interactions, and automate QA all in real-time for quality and compliance monitoring. Agent performance, which can relate to effectiveness, may be measured based on the identification of awkward or extended silences in the post-call/client interaction data, silence duration, interaction level values, and location-based silence by channel. The client's experience may be measured based on the level of engagement between the agent and the client, an end of call score, a beginning of call score, and a minimum/maximum/average score. The transcripts may be analysed to determine language and behaviours that the client finds positive. By measuring the agents and client interactions against these KPIs, the client experience can be improved, and agent training can be optimized. The analysed transcript for the client interaction is stored in the database 140.

The QA and KPI module 136 may assign a score or scores to the client interaction. A score may be applied that indicates an identified level of abuse, an identified level of quality of the client interaction, and a severity of complaint. The score indicating abuse may be numeric with, for example, a lower number indicating that there is no abuse present or a very low level of perceived abuse. A higher number may indicate a high level of abuse. A score indicating a quality level of the client interaction may be numeric with a lower number indicating a low quality which may be indicative of prolonged or awkward silences, or lack of effective conversation with the client. A higher number may be indicative of a smoother conversation where there are no prolonged or awkward silences. A score indicating the severity of the complaint may be numeric which a lower number indicating that the detected complaint is not serious and a higher number indicating that the detected complaint is serious and may require escalation. The severity of the complaint and the score level assigned is based on the intent and sentiment analytics carried out by the sentiment analysis module 134. The scoring may be indicated in another way, such as with letters or another system.

The reporting module 138 generates reports relating to the client interaction and the results of the analysis for management, QA, and training purposes. The reporting module 138 extracts the required information relating to the client interaction from the database 140 to generate the report. By transcribing 100% of client interactions, the captured data also can be used for training purposes.

The stored client interactions, annotated and analysed transcripts may be accessed at any time and viewed or reprocessed. In the event that the server 130 is updated to include new modules, updates are made to the existing modules, or the machine learning model is retrained, the original or annotated and analysed transcripts can be reprocessed to provide new or updated analysis results. The client interactions can be extracted from the database 140 based on date, intent, sentiment, keyword, or complaint.

Figure 2:
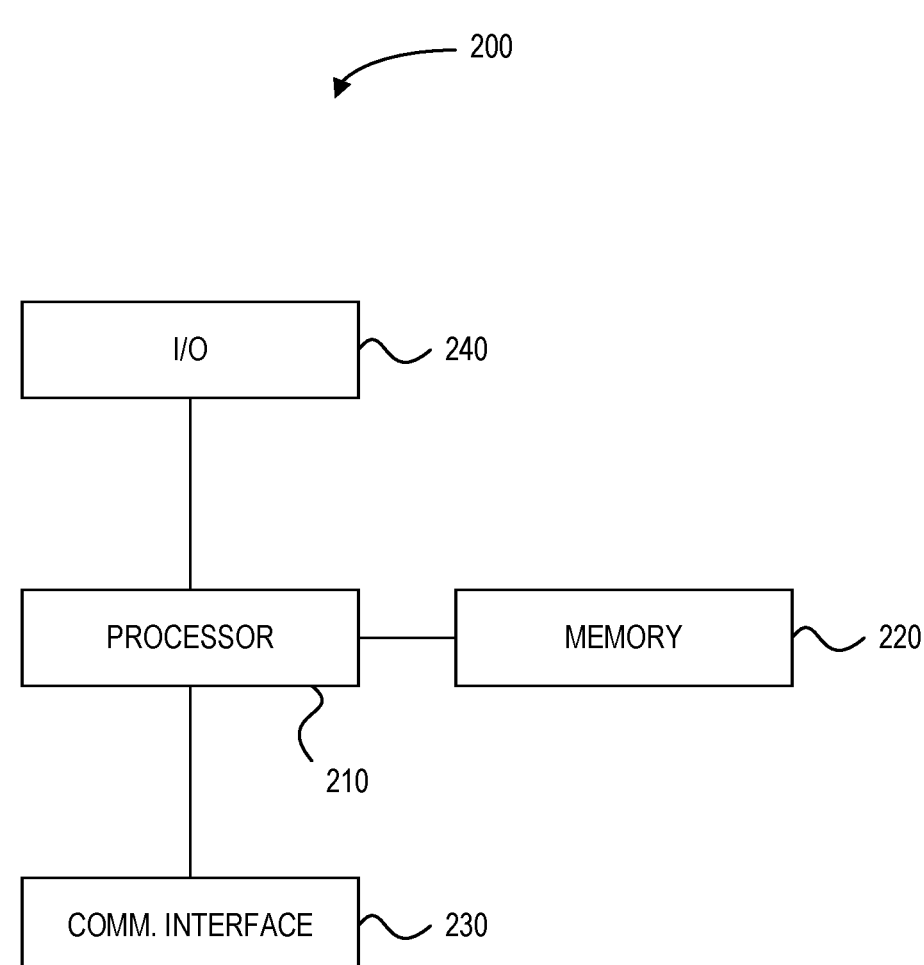
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as the recording module 120, the server 130, and the database 140. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230 and may also transmit or receive data via any additional input/output device 240 as appropriate.

Computer 200 may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Figure 3:
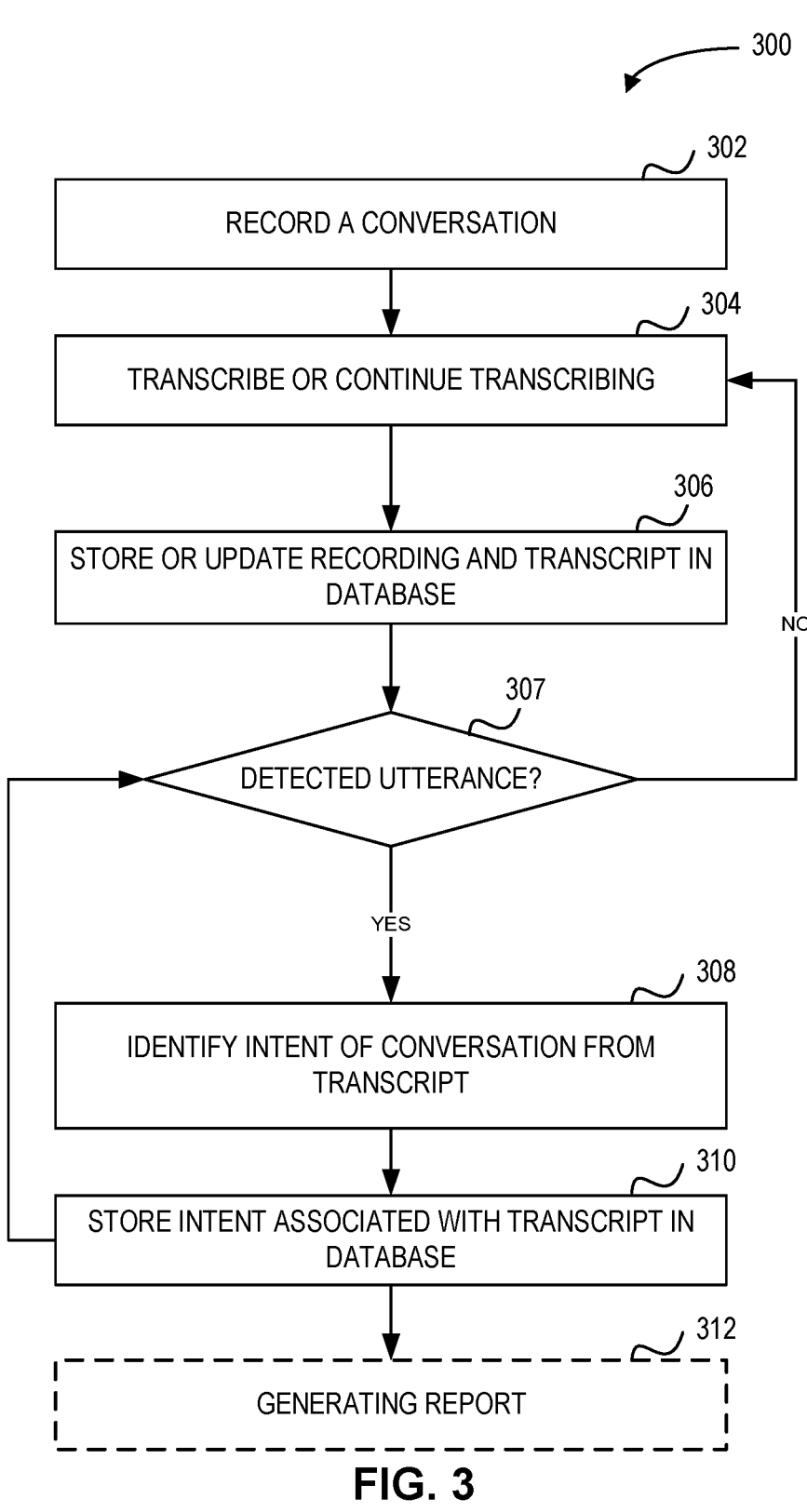
FIG. 3 is a flowchart diagram of an example method for interaction analytics.

Referring now to FIG. 3, there is illustrated a flowchart diagram of an example method for interaction analytics. The method 300 may be carried out, for example, by the interaction analytics system 100 of FIG. 1.

The method 300 begins at step 302 and a client interaction is recorded. The client initiates a client interaction with the service provider 110 and is connected with an agent. The client interaction may be recorded by the recording module 120.

At step 304 the client interaction is transcribed. The recording of the client interaction 160 is sent to the transcribing module 132. The transcribing module 132 transcribes the client interaction and creates a file that contains the client interaction in written form, i.e., a transcript of the client interaction. The transcript contains utterances associated with the client interaction. The transcribing module 132 may include a machine learning model to aid the transcription process. The transcript may be annotated, with the annotations used to identify client intents. The transcribing module 132 identifies the entities, e.g., the client and the agent, as part of the transcription process, which may be represented as annotations on the transcript.

In some cases, the recording may be in another language such as Spanish or French. The transcribing module 132 automatically translates the recording into a single language, such as English, resulting in the transcript being in the single, common language. The recording and the transcribing may be performed in real-time.

At step 306 the recording and the transcript are stored in database 140. This may happen continuously while the interaction continues. The recording and the transcript may be retrieved from the database 140 at any later time for review or reprocessing.

At step 307, a discrete utterance is detected in the transcription. If no utterance is detected, then the process may return to step 304 to await further utterances.

At step 308 the intent of the client interaction is identified based on the most recently detected discrete utterance and the transcript of the client interaction preceding the recently detected discrete utterance. The discrete utterance and/or transcript is sent to the sentiment analysis module 134. The sentiment analysis module 134 analyses the transcript to determine the overall intent of the client interaction along with the current and overall sentiment of the client interaction. Intent recognition may be based on a data dictionary or dictionaries, such in XML or JSON files. The intent of the call may be based on matching keywords in the transcript to keywords within the data dictionary, e.g. opening or closing an account. The intent may also be determined based on the sentiment, or sentiments, detected in the client interaction. The sentiment analysis module 134 determines if the sentiment of the call is positive, negative, or neutral at a given point in time or overall. Key word searching is applied to determine the nature of the call so that relevant topics can be retrieved to inform the agent's prompts for steering the client interaction.

The sentiment analysis module 134 identifies non-talk time, cross talk, and abuse in the call. Abuse is detected based partly on determining the intent of the client, partly on the sentiment of the client interaction, and partly based on QA, therefore detecting what the client interaction is about, whether the client interaction is positive or negative, and identifying parts of the client interaction that are not relevant to the intent, or specific words of phrases. The sentiment analysis module 134 determines the sentiment of both the agent and the client, the intent of the call, and the presence of abuse.

The sentiment analysis module 134 identifies complaints by detecting keywords flagged in the transcript and additional processing to identify that the client interaction relates to a complaint. The sentiment analysis module 134 tags it, therefore future interactions with the same client that may also relate to the same topic can be tagged creating a timeline for the complaint. The sentiment analysis module 134 provides an indication that an escalation is required, e.g. to an agent supervisor.

The sentiment analysis module 134 provides a machine learning model to enhance the analysis of the transcript and accuracy of the machine learning model can be improved by training with data from the service provider's 110 environment, e.g. previously analysed transcripts. The sentiment analysis can be performed by the sentiment analysis module 134 continuously to identify a sentiment (and an associated confidence level) for every utterance in the client interaction.

At step 310 the identified intent of the client interaction is stored in the database 140, i.e., the analytics are stored in the database 140 and correspond to a client interaction. The determined intent, and other analytics, may be retrieved from the database 140 at any time for review or reprocessing.

If there are further utterances to analyse, the process returns to step 307.

At step 312 a report may be generated by the reporting module 138. This may include information on the client interaction including the intent, presence of abuse, and QA information such as sales effectiveness which may be measured based on the identification of awkward or extended silences in the post-call/client interaction data, silence duration, interaction level values, and location-based silence by channel. The client's experience may be measured based on the level of engagement between the agent and the client, an end of call score, a beginning of call score, and a minimum/maximum/average score. The transcripts may be analysed to determine language and behaviours that the client finds positive.

The method may also assign a score or scores to the client interaction. This is performed by the QA and KPI analysis module 136. A score may be applied to indicate an identified level of abuse, an identified level of quality of the client interaction, and a severity of complaint. The severity of the complaint and the score level assigned is based on the intent and sentiment analytics carried out by the sentiment analysis module 134. The scoring may be indicated in another way, such as with letters or another system.

The described system and method generally provide the transcription functionality, entity recognition, intent recognition (e.g., account opening), with further functionality for sentiment analysis, managerial analysis, and complaint tracking. Use of the system 100 ensures that all client interactions are recorded, the accuracy of the transcription is improved, and the service provider has control of the maintenance and expansion of the platform.

The transcribing of client interactions, sentiment analysis, annotation, and storing of them allows:

keyword monitoring and searching—e.g., easy searching through call transcripts by a keyword, flagging calls based on a keyword, and identification of trends in calls over time;

call searching capabilities—e.g., searching through transcripts and identifying a number of call transcripts with similar intent, sentiment, or relating to a particular complaint, etc.;

selection of a spot on a call and returning to that spot via a direct link; and return to previously transcribed call and reprocess them.

The system 100 may capture the recording in real-time, and perform the transcription and sentiment analysis in real-time, or near real-time, allowing for abuse detection and complaint detection to be almost immediate.

In the context of the described embodiments, the term "real-time" refers to a period of processing time that seems immediate or near-immediate in human terms and thereby permits a degree of interactivity without undue delay or deferral. In computing terms, this corresponds to a level of computer responsiveness such that processing is completed within a specified time constraint between an event and its response deadline. In some contexts, the specified time constraint may be on the order of 10 to 500 milliseconds, in some other contexts, the specified time constraint may be on the order of 500 milliseconds to 10 seconds, and in still other contexts, the specified time constraint may be on the order of 10 seconds to 1 minute, and in yet other contexts, the specified time constraint may be on the order of 1 minute to 10 minutes. Several contexts may be applicable in some embodiments. For example, in some embodiments, real-time transcription may be performed within about 500 milliseconds to 10 seconds, whereas real-time sentiment analysis may be performed within about 10 seconds to 1 minute.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112a, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for monitoring a call between a user and an agent, the system comprising:

a database;

an agent terminal;

at least one server configured to:

record a conversation with the user to the database;

generate, in real-time, a transcript corresponding to the conversation, the transcript comprising a plurality of utterances and an indication of the user;

identify, in real-time and based on the plurality of utterances, at least one intent of the conversation from the transcript and annotate the transcript with the at least one intent;

analyse, in real-time, the transcript and the at least one intent annotated in the transcript to identify at least one sentiment, wherein the at least one sentiment comprises a complaint;

search the database for the complaint in association with the user;

identify, in response to the search, a stored transcript in the database, the stored transcript associated with the complaint and the user; and generate and send a prompt to the agent terminal, the prompt based on the identification of the stored transcript associated with the complaint and the user.

2. The system of claim 1, wherein the at least one intent is identified using a data dictionary.

3. The system of claim 1, wherein the at least one server is further configured to analyse the conversation and the transcript to determine a plurality of sentiments respectively corresponding to the plurality of utterances in the transcript.

4. The system of claim 3, wherein each of the plurality of sentiments has a corresponding confidence level.

5. The system of claim 3, wherein the at least one intent is identified further based on the plurality of sentiments.

6. The system of claim 3 wherein the at least one server is further configured generate at least one score for the conversation.

7. The system of claim 6, wherein the at least one score comprises an abuse score.

8. The system of claim 6, wherein the at least one score comprises a quality score.

9. The system of claim 6, wherein the at least one score comprises a complaint score.

10. The system of claim 9, wherein the complaint score is determined based on the at least one intent and the plurality of sentiments.

11. The system of claim 3, wherein the at least one intent is identified using a machine learning model, the machine learning model being trained on one or more previously captured transcripts.

12. A method for monitoring a call between a user and an agent, the method comprising:

recording a conversation with the user;

generating, in real-time, a transcript corresponding to the conversation, the transcript comprising a plurality of utterances and an indication of the user;

identifying, in real-time and based on the plurality of utterances, at least one intent of the conversation from the transcript and annotating the transcript with the at least one intent;

analysing, in real-time, the transcript and the at least one intent annotated in the transcript to identify at least one sentiment, wherein the at least one sentiment comprises a complaint;

automatically searching the database for the complaint in association with the user;

identifying, in response to the search, a stored transcript in the database, the stored transcript associated with the complaint and the user; and generating and sending a prompt to the agent terminal, the prompt based on the identification of the stored transcript associated with the complaint and the user.

13. The method of claim 12 wherein the identifying the at least one intent comprises using a data dictionary.

14. The method of claim 12, further comprising:

analysing the recording and the transcript to determine a plurality of sentiments respectively corresponding to a plurality of utterances in the transcript.

15. The method of claim 14, wherein the identifying the at least one intent is based on the plurality of sentiments.

16. The method of claim 14, further comprising generating at least one score for the conversation.

17. The method of claim 16, wherein the at least one score comprises one or more of an abuse score, a quality score, and a complaint score.

18. The method of claim 17, further comprising determining the complaint score based on the at least one intent and the plurality of sentiments.

19. The method of claim 14, wherein the identifying the at least one intent comprises using a machine learning model, the machine learning model being trained on one or more previously captured transcripts.

20. A non-transitory computer readable medium storing computer executable instructions which, when executed by at least one computer processor, cause the at least one computer processor to carry out a method for monitoring a call between a user and an agent, the method comprising:

recording a conversation with the user;

generating, in real-time, a transcript corresponding to the conversation, the transcript comprising a plurality of utterances and an indication of the user;

analysing, in real-time, the transcript and the at least one intent annotated in the transcript to identify at least one sentiment, wherein the at least one sentiment comprises a complaint;

automatically searching the database for the complaint in association with the user; identifying, in response to the search, a stored transcript in the database, the stored transcript associated with the complaint and the user; and generating and sending a prompt to the agent terminal, the prompt based on the identification of the stored transcript associated with the complaint and the user.

* * * * *